(12) United States Patent
Herrman et al.

(10) Patent No.: US 11,055,755 B2
(45) Date of Patent: Jul. 6, 2021

(54) METHOD FOR QUOTING PART PRODUCTION

(71) Applicant: Plethora Corporation, San Francisco, CA (US)

(72) Inventors: Jeremy Herrman, San Francisco, CA (US); Nicholas J. Pinkston, San Francisco, CA (US)

(73) Assignee: Plethora Corporation, San Francisco, CA (US)

( * ) Notice: Subject to any disclaimer, the term of this patent is extended or adjusted under 35 U.S.C. 154(b) by 42 days.

(21) Appl. No.: 16/993,075

(22) Filed: Aug. 13, 2020

(65) Prior Publication Data

US 2020/0372558 A1  Nov. 26, 2020

Related U.S. Application Data

(63) Continuation of application No. 16/355,053, filed on Mar. 15, 2019, now Pat. No. 10,776,841, which is a (Continued)

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0611* (2013.01); *G06Q 30/0283* (2013.01)

(58) Field of Classification Search
CPC .................................. G06Q 30/06–08
(Continued)

(56) References Cited

U.S. PATENT DOCUMENTS 4,901,253 A   2/1990 Iwano et al.
4,974,165 A   11/1990 Locke et al.
(Continued)

OTHER PUBLICATIONS

Manufacturing; Study Data from S. Mouton et al Provide new Insights into Manufacturing" (Defense & Aerospace Business, Jul. 6, 2011, p. 218) (hereinafter "Manufacturing").", Aug. 22, 2017.
(Continued)

*Primary Examiner* — Ming Shui
(74) *Attorney, Agent, or Firm* — Jeffrey Schox; Diana Lin

(57) ABSTRACT

One variation of a method for quoting manufacture of a part during construction of a virtual model of the part within a computer-aided drafting engine includes: receiving a quote file specifying a current manufacturing schedule and a pricing structure for a manufacturing facility; at a first time, in response to insertion of a first three-dimensional virtual geometry into the virtual model, calculating a manufacturing quote for the part based on the first three-dimensional virtual geometry and the quote file; displaying the manufacturing quote; at a second time succeeding the first time, in response to insertion of a second three-dimensional virtual geometry into the virtual model, updating the manufacturing quote based on the second three-dimensional virtual geometry and the quote file; and, at a third time succeeding the second time, submitting a form of the virtual model to the manufacturing facility for manufacture of the part.

20 Claims, 5 Drawing Sheets

Related U.S. Application Data continuation of application No. 15/971,102, filed on May 4, 2018, now abandoned, which is a continuation of application No. 15/611,096, filed on Jun. 1, 2017, now abandoned, which is a continuation of application No. 14/517,711, filed on Oct. 17, 2014, now Pat. No. 9,697,554.

(60) Provisional application No. 61/892,367, filed on Oct. 17, 2013.

(58) Field of Classification Search
USPC .............................................. 705/26.1–27.2
See application file for complete search history.

(56) References Cited

U.S. PATENT DOCUMENTS

| | | | |
|---|---|---|---|
| 5,243,665 A | 9/1993 | Maney et al. | |
| 5,552,995 A | 9/1996 | Sebastian | |
| 5,717,598 A | 2/1998 | Miyakawa et al. | |
| 5,726,917 A | 3/1998 | Staaden | |
| 5,796,619 A | 8/1998 | Aampler | |
| 5,822,206 A | 10/1998 | Sebastian et al. | |
| 5,910,894 A | 6/1999 | Pryor | |
| 6,223,092 B1 | 4/2001 | Miyakawa et al. | |
| 6,295,513 B1 | 9/2001 | Thackston | |
| 6,625,616 B1 | 9/2003 | Dragon et al. | |
| 6,675,055 B1 | 1/2004 | Fischer | |
| 6,701,200 B1 | 3/2004 | Lukis et al. | |
| 6,836,699 B2 | 12/2004 | Lukis et al. | |
| 6,879,933 B2 | 4/2005 | Steffey et al. | |
| 6,928,396 B2 | 8/2005 | Thackston | |
| 7,027,889 B2 | 4/2006 | Nakamura | |
| 7,089,082 B1 | 8/2006 | Lukis et al. | |
| 7,103,434 B2 | 9/2006 | Chernyak et al. | |
| 7,123,986 B2 | 10/2006 | Lukis et al. | |
| 7,146,291 B2 | 12/2006 | Hough | |
| 7,216,011 B2 | 5/2007 | Brisebois | |
| 7,299,101 B2 | 11/2007 | Lukis et al. | |
| 7,327,869 B2 | 2/2008 | Boyer | |
| 7,493,183 B2 | 2/2009 | Bjornson et al. | |
| 7,496,528 B2 | 2/2009 | Lukis et al. | |
| 7,590,466 B2 | 9/2009 | Lukis et al. | |
| 7,603,191 B2 | 10/2009 | Gross | |
| 7,840,443 B2 | 11/2010 | Lukis et al. | |
| 8,014,889 B2 | 9/2011 | Zinniel et al. | |
| 8,032,343 B2 | 10/2011 | Cai et al. | |
| 8,140,401 B2 | 3/2012 | Lukis et al. | |
| 8,219,230 B2 | 7/2012 | Sinha et al. | |
| 8,239,284 B2 | 8/2012 | Lukis et al. | |
| 8,295,971 B2 | 10/2012 | Krantz | |
| 8,370,117 B2 | 2/2013 | Sims et al. | |
| 8,370,118 B2 | 2/2013 | Sims | |
| 8,423,325 B2 | 4/2013 | Sims | |
| 8,538,574 B2 | 9/2013 | Hahn | |
| 8,581,855 B2 | 11/2013 | Spink et al. | |
| 8,695,958 B2 | 4/2014 | Marrinan et al. | |
| 8,706,283 B2 | 4/2014 | Wang et al. | |
| 8,745,517 B2 | 6/2014 | Hartloff | |
| 8,780,223 B2 | 7/2014 | Beauchemin | |
| 8,799,830 B2 | 8/2014 | Robles | |
| 8,917,320 B2 | 12/2014 | Beauchemin | |
| 8,930,042 B2 | 1/2015 | Jang et al. | |
| 9,187,188 B2 | 11/2015 | Richter et al. | |
| 9,292,626 B2 | 3/2016 | Nelaturi et al. | |
| 9,310,189 B2 | 4/2016 | Burgunder et al. | |
| 9,697,554 B2 | 7/2017 | Herrman et al. | |
| 10,776,841 B2 * | 9/2020 | Herrman | G06Q 30/0283 |
| 2004/0250236 A1 | 12/2004 | Omalley et al. | |
| 2005/0120010 A1 | 6/2005 | Philpott et al. | |
| 2007/0042327 A1 | 2/2007 | Swift | |
| 2007/0206030 A1 | 9/2007 | Lukis | |
| 2008/0015947 A1 | 1/2008 | Swift | |
| 2008/0269942 A1 | 10/2008 | Free | |
| 2009/0198505 A1 | 8/2009 | Gipps et al. | |
| 2010/0332196 A1 | 12/2010 | Fisker et al. | |
| 2011/0047140 A1 | 2/2011 | Free | |
| 2012/0271443 A1 | 10/2012 | Sinha et al. | |

OTHER PUBLICATIONS

"Hui-Fen Wang, You-Liang Zhang, CAD/CAM integrated system in collaborative environment, Robotics and Computer Integrated Manufacturing, vol. 18, Issue 2, Apr. 2002, pp. 135-145".

"Tek-Jin Nam, David Wright, the development and evaluation of Syco3D: a real-time collaborative 3D CAD system, Design Studies, vol. 22, Issue 6, Nov. 2001, pp. 557-582.".

* cited by examiner

METHOD FOR QUOTING PART PRODUCTION

CROSS-REFERENCE TO RELATED APPLICATIONS

This application is a continuation of U.S. patent application Ser. No. 16/355,053, filed 15 Mar. 2019 which is a continuation of U.S. patent application Ser. No. 15/971,102, filed 4 May 2018, which is a continuation of U.S. patent application Ser. No. 15/611,096, filed 1 Jun. 2017, which is a continuation of U.S. patent application Ser. No. 14/517,711, filed 17 Oct. 2014 (U.S. Pat. No. 9,697,554 issued 4 Jul. 2017), which claims the benefit of U.S. Provisional Application No. 61/892,367, filed on 17 Oct. 2013, which are both incorporated in their entirety by this reference.

TECHNICAL FIELD

This invention relates generally to the field of manufacturing, and more specifically to a new and useful method for quoting part production in the field of manufacturing.

DESCRIPTION OF THE EMBODIMENTS

The following description of the embodiments of the invention is not intended to limit the invention to these embodiments, but rather to enable a person skilled in the art to make and use this invention.

1. Method

Figure 1:
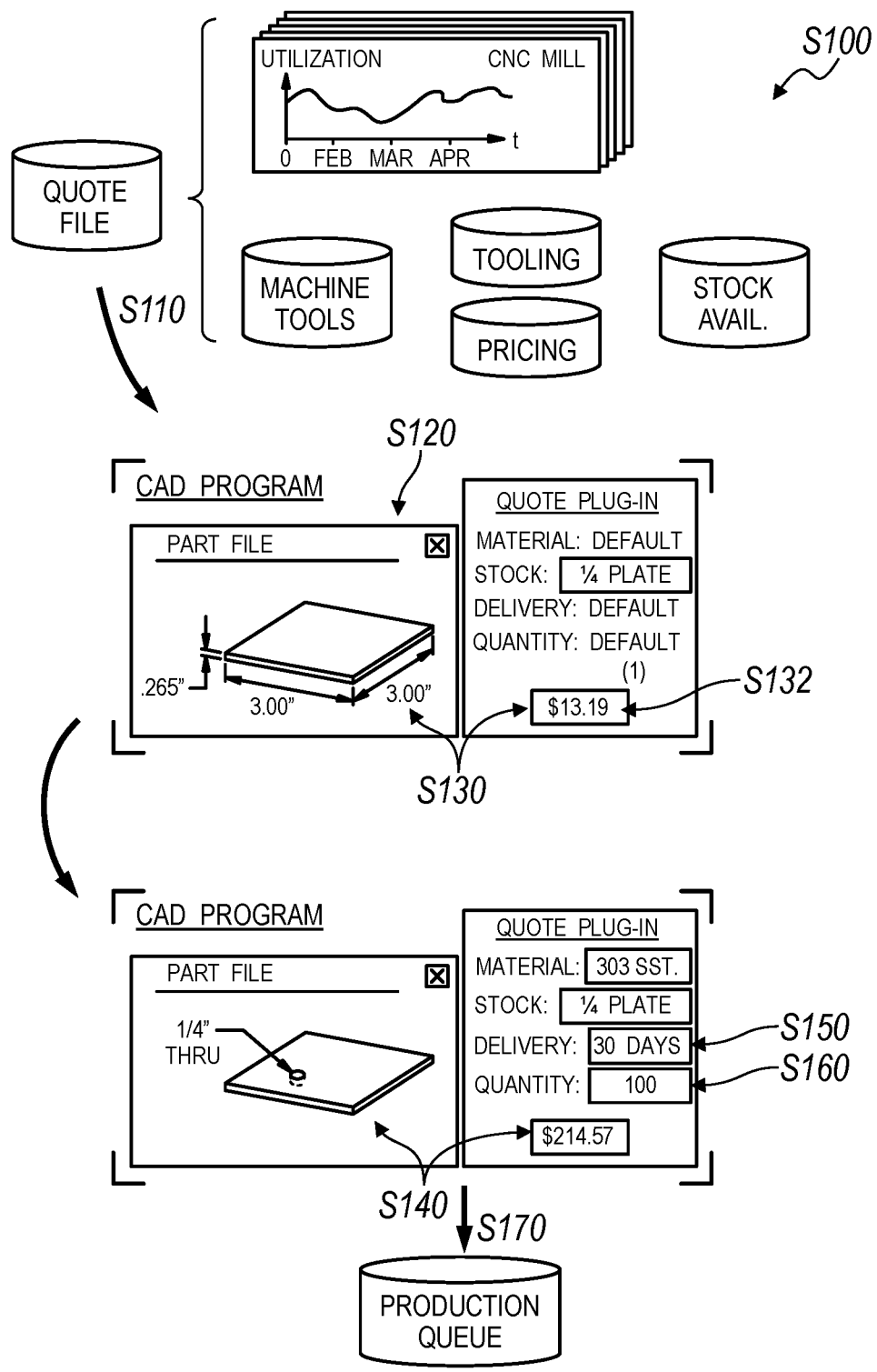
FIG. 1 is a flowchart representation of a method.

As shown in FIG. 1, a method S100 for quoting manufacture of a real part during construction of a virtual model of the real part within a computer-aided drafting engine executing on a computing device, the method S100 including: at the computer-aided drafting engine, receiving a quote file specifying a current manufacturing schedule and a pricing structure for a manufacturing facility in Block S110; at a first time, in response to insertion of a first three-dimensional virtual geometry of the virtual model into the computer-aided drafting engine, calculating a manufacturing quote for the real part based on the first three-dimensional virtual geometry and the quote file in Block S130; displaying the manufacturing quote within the computer-aided drafting engine in Block S132; at a second time succeeding the first time, in response to insertion of a second three-dimensional virtual geometry of the virtual model into the computer-aided drafting engine, updating the manufacturing quote displayed within the computer-aided drafting engine based on the second three-dimensional virtual geometry and the quote file in Block S140; and at a third time succeeding the second time, submitting, over a computer network, a form of the virtual model to the manufacturing facility for manufacture of the real part in Block S170.

Figure 2:
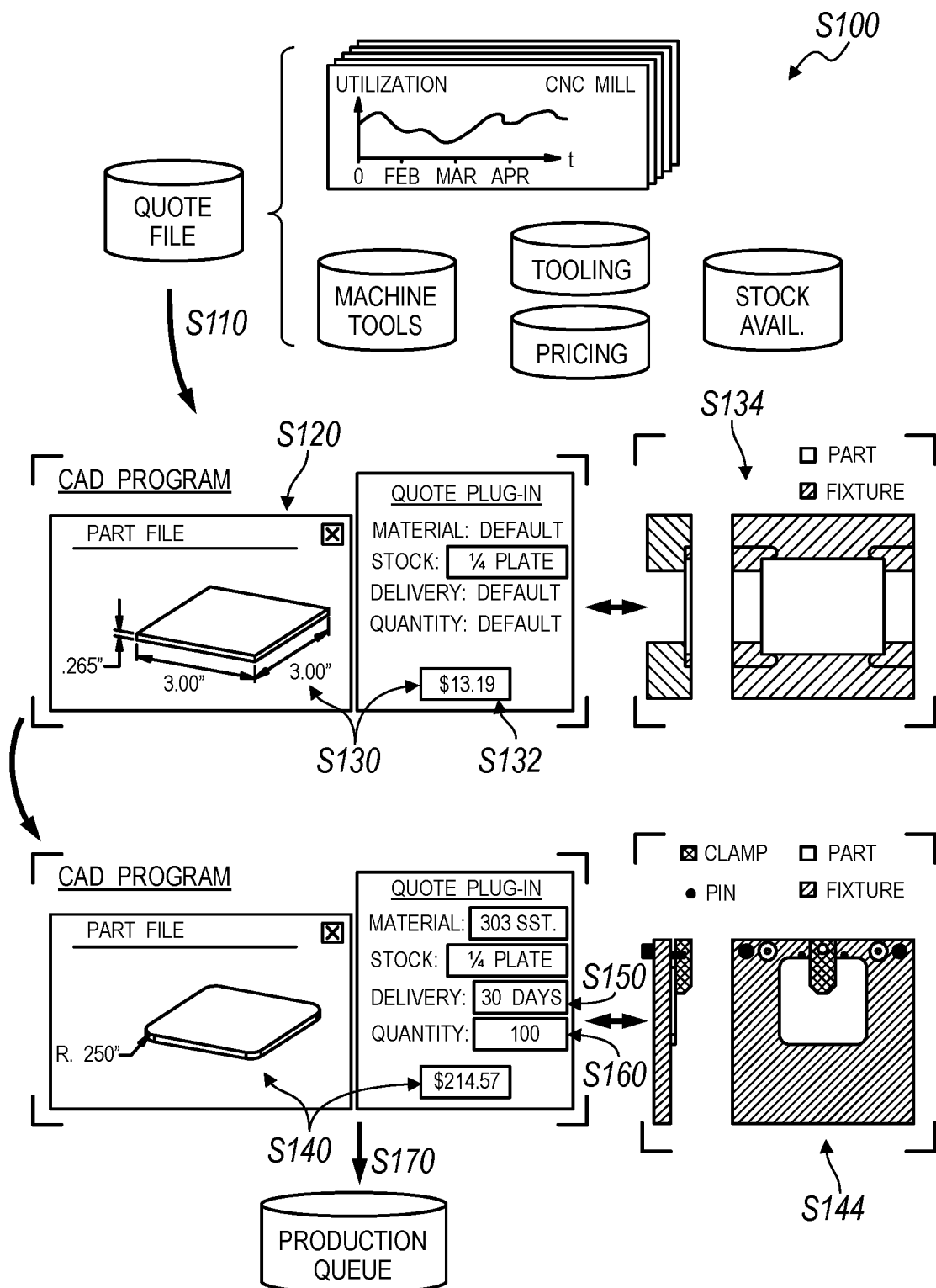
FIG. 2 is a flowchart representation of one variation of the method.

As shown in FIG. 2, one variation of the method S100 includes: at a first time, in response to insertion of a first three-dimensional virtual geometry of the virtual model into the computer-aided drafting engine, predicting a fixturing method for the real part based on the first three-dimensional virtual geometry in Block S134; calculating a manufacturing quote for the real part based on the first three-dimensional virtual geometry, the fixturing method, and a pricing structure for a manufacturing facility in Block S130; displaying the manufacturing quote within the computer-aided drafting engine in Block S132; at a second time succeeding the first time, in response to insertion of a second three-dimensional virtual geometry of the virtual model into the computer-aided drafting engine, updating the fixturing method for the real part based on the second three-dimensional virtual geometry in Block S144; updating the manufacturing quote displayed within the computer-aided drafting engine based on the second three-dimensional virtual geometry, the updated fixturing method, and the pricing structure for the manufacturing facility in Block S140; and at a third time succeeding the second time, submitting, over a computer network, an order for the real part to the manufacturing facility in Block S110.

2. Applications

Generally, the method S100 implements real-time quoting for a manufacture of one or more real parts based on a virtual model of the part generated within a computer-aided drafting (CAD) program and according to current (e.g., substantially real-time) manufacturing-related variable specific to a particular manufacturing facility (or group of manufacturing facilities), such as collected and stored in the form of a quote file specific to the manufacturing facility. The method S100 can be implemented within the CAD program executing locally on a user's workstation (e.g., desktop computer, laptop computer) to generate a manufacturing quote as soon as a first virtual feature of the corresponding virtual model is constructed within the CAD program; the method S100 can then be implemented to update the manufacturing quote as each additional virtual feature is added, as a virtual dimensional or geometric tolerance is added or changed, as a virtual feature dimension is changed, as a unit quantity of an order for the real part is set or adjusted, as a delivery time for the order is set or adjusted, or as a manufacturing availability of the manufacturing facility changes, etc. substantially in real-time and throughout construction of the virtual model of the real part within the CAD program.

For example, the method S100 can apply a quote file specific to a particular manufacturing facility or manufacturing group to a virtual model of a real part to generate and then display a new or updated quote (including total cost, per-unit cost, and/or lead time, etc.) to manufacture one or more units of the real part as each new virtual geometry (e.g., a boss, a counterbore, a pocket, etc.) is added to the part file. To generate or update the quote, the method S100 can apply a selected material, part stock and part feature dimensions, part order quantity, and a delivery date or window to current, confirmed, and/or projected machining center availability, machining center configuration, manufacturing schedule or calendar, pricing structure, etc. for the manufacturing facility, all without necessitating transmission all or a portion of the virtual model to the manufacturing facility.

By collecting current manufacturing facility-specific data—such as by downloading a quote file directly from the manufacturing facility—and applying these data to a virtual model locally on a user's computing device, the method S100 can enable secure real-time quoting for production of units of the real part by the specific manufacturing facility based on real and current manufacturing capabilities of the manufacturing facility. In particular, rather than uploading all or a portion of a virtual (e.g., CAD) model of the real part to a remote server for processing to generate a quote for manufacture of a unit of a real part, the method S100 can execute locally with the CAD program during construction of a virtual model of the real part such that none (or only a limited portion) of the virtual model needs to be transmitted from a user's workstation to generate a quote for manufacture of one or more units of the real part. Furthermore, by downloading real and current manufacturing data from a manufacturing facility and executing locally on the user's workstation, the method S100 can generate a manufacturing quote for an order substantially in real-time as features are added to the virtual model rather than only once the virtual model is completed and submitted to the manufacturing facility. In particular, by updating the quote as new features are added to the part file, as a material is selected or changed, as an order quantity is entered or adjusted, and/or as a delivery date is specified, etc., the method S100 can enable a user to immediately ascertain the effect of each feature, material, tolerance requirement, delivery date, etc. on per-unit cost, total cost, lead time, etc. for an order for one or more units of the real part without repeatedly re-submitting the virtual model of the real part (e.g., in various stages of completion) to a remote entity (e.g., the manufacturing facility) for quoting.

Furthermore, the method S100 can automatically detect a possible or preferred fixturing method for the real part—such as for a real part that is machined (e.g., turned, milled)—in response to insertion of a first (or otherwise early) virtual geometry into the CAD program, automatically estimate a cost to manufacture a custom fixture (if relevant, such as based on a quantity of units of the part specified for the order), and calculate a per-unit fixturing for manufacture of the real part according to the fixturing method to calculate a total cost to manufacture units of a part in a current order. The method S100 can further update the predicted fixturing method, predict part flips, update a preferred manufacturing process (e.g., turning, milling, casting, etc.), modify an automatically-generated virtual model of a fixture, and/or update the manufacturing quote as each additional feature is added to the model, as dimensional or geometric tolerances are adjusted, as a unit quantity of real parts in the order is adjusted, etc. For example, the method S100 can automatically select standardized fixturing with hard jaws for an initial order quantity of one unit of the real part, and then automatically update the order to specify a set of custom soft jaws in response to adjustment of the order quantity to fifty units. In this example, the method S100 can also update the order to specify a custom fixture plate in response to insertion of subsequent virtual geometry necessitating a part flip and election of a tighter dimensional tolerance (e.g., 0.005" to 0.002"). The method S100 can thus automatically predict a fixturing method that lowers a manufacturing cost to the user for the order, increases probability of meeting requirements (e.g., tolerances) of the part, and/or diminishes lead time for delivery of the order (e.g., based on machining center availability, calculated machine time), etc., and the method S100 can automatically generate a virtual model of a fixture for the real part and transmit this virtual model (and/or code in machining center language for manufacturing the fixture, etc.) to the manufacturing facility with submission of the order to the manufacturing facility.

Alternatively, the method S100 can automatically generate various fixturing-related details—such as fixture type, machining operation schedule, and projected fixture cost—locally at the workstation and then submit these details to a server affiliated with the manufacturing facility; an application executing on the server can then generate a virtual model of the fixture for the real part based on these details.

The method S100 can be implemented within a CAD modeling program (or software, engine, etc.) executing on a computing device, such as a desktop computer, laptop computer, or tablet. For example, the method S100 can execute within a real-time quoting plug-in and/or a design-for-manufacturability (DFM) plug-in executing within the CAD program to retrieve a quote file over the Internet and to compare virtual model features with the quote file locally to generate and display the manufacturing quote in real-time within the CAD program. Alternatively, the method S100 can be executed remotely from a workstation, such as within an application server hosting a native computer-aided drafting application or locally on a server hosted by the manufacturing facility. However, the method S100 can be implemented on any other computer system, such as a cloud-based, mainframe computer system, grid-computer system, or other suitable computer system.

3. Quote File

Block S110 of the method S100 recites, at the computer-aided drafting engine, receiving a quote file for a manufacturing facility. Generally, Block S110 functions to download (current or anticipated future) manufacturing-related parameters for a local manufacturing facility for application to the current virtual model of the real part for calculation of a cost to manufacture a unit of the real part in Blocks S130 and S140. For example, Block S110 can collect a quote file containing machining center availability, machining center configuration, a current manufacturing schedule, a pricing structure, a pricing model (e.g., a relationship between part surface area and manufacturing cost, a relationship between manufacturing cost and a ratio of part surface area to part volume), cutting tool availability, feature manufacturing risk, and/or manufacturing history, etc. of a manufacturing facility.

In one implementation, the quote file contains per-unit-time pricing for available machining centers, such as the cost to consume a vertical CNC milling machine for one minute. The per-unit-time pricing can be a static (i.e., constant) per-unit-time cost. For example, Block S110 can collect a quote file that specifies a first static per-unit-time cost to operate the vertical CNC milling machine (e.g., compensating for power consumption and machining center depreciation) and a second static per-unit-time cost for setup of the vertical CNC milling machine (e.g., when a part is being loaded into the vertical CNC milling machine but a machining cycle has not yet been started). Blocks S130, S134, S140, and S144 can thus selectively apply the first and second per-unit-time costs to projected machine times and projected setup times for a unit of the real part, respectively, to estimate a cost to manufacture one or more units of the real part. Alternatively, the quote file can specify a variable per-unit-time cost, such as in the form of a continuous or stepped time-cost function that specifies variances in (average) cost per unit of time of continuous machining center use over time. The variable per-unit-time cost can reflect changing electricity costs during a work day, variable shop pricing per hour (e.g., for overtime, for fully-automated work periods and semi-automated work periods within the manufacturing facility), machining center needs for other confirmed jobs in a calendar or schedule for the manufacturing facility, etc.

The quote file can similarly contain per-unit-time setup costs, such as cost per unit time to create or modify specialized tooling and fixtures, to load tooling and fixtures into machining centers, to generate machining or production files (e.g., G-code files, .step files, etc.). In this implementation, the per-unit-time setup pricing can be static per unit time, static per unit time for a particular type of work or operation, or variable over time, such as described above. The per-unit-time setup pricing can further include definitions to trigger manufacture of custom tooling and/or fixtures and associated (fixed or variable) costs based on costs to produce a certain number of units with and without such custom tooling and/or fixtures, as described below.

In the foregoing implementation, Block S110 can also collect a quote file that contains per-unit-time pricing for various types of manufacturing methods (e.g., machining centers), such as for conventional machining (e.g., turning, milling), forming (e.g., spinning, stamping, punching), cutting (e.g., waterjet cutting, wire EDM, laser cutting), additive manufacturing (e.g., fused deposition modeling), welding and brazing, casting (e.g., sand casting, investment casting, die casting), injection molding, and/or other manufacturing and/or finishing processes supported by the manufacturing facility.

The quote file can also contain per-unit and/or per-unit-time pricing for available tooling for particular machining centers, machining center groups, or machining center types. For example, the quote file can specify available endmills and their sizes, configurations, coatings, materials, and assigned milling material (e.g., plastic, steel, brass, aluminum, or other) for all or a subset of CNC milling machines within the manufacturing facility. In this implementation, the quote file can specify a static per-unit and/or per-unit-time pricing for a particular cutting tool. Alternatively, the quote file can contain a model defining a time-dependent continuous function or step function for cost to machine with the particular tool, such as based on a general or tool-specific wear model defining end-of-life or useful-life duration for the particular tool, such as dependent on part material type, spindle speed, feed rate, and/or cut type (e.g., climbing or conventional), etc. for a machining operation. Block S130 can thus preemptively: elect a machining center and a particular cutting tool—from the set of available machining centers and available cutting tools for the manufacturing facility—to machine a unit of the real part according to the first three-dimensional virtual geometry; predict a toolpath, spindle speed, and feed rate for the particular cutting tool to machine the first three-dimensional virtual geometry; and thus calculate a cost for use of the particular tool in manufacturing a unit of the real part according to the current virtual model.

The quote file can further specify machining center availability over a period of time for the manufacturing facility, such as a chart or schedule of confirmed and scheduled current and upcoming jobs. The quote file can also specify predicted upcoming jobs, such as based on weekly, monthly, quarterly, or annual part order types, quantities, materials, machining times, setup times, and associated tooling and machining center needs, etc. The quote file can similarly specify tooling availability over time, such as based on confirmed, scheduled, and/or predicted future jobs, as shown in FIG. 1. In particular, the quote file can include a calendar of current, scheduled, and/or predicted configurations of machining centers over a period time (e.g., eight weeks), such as which machining centers are or will be configured to handle certain materials, what tooling is or will be loaded into particular machining centers, and fixturing types assigned to the machining centers (e.g., vices with hard jaws, vices with soft jaws, vacuum plate, T-slot bed for custom fixtures, indexing head, etc.). For example, the quote file can specify when a particular CNC milling machine is scheduled to machine plastics, aluminum alloys, steel alloys, and/or copper alloys. The quote file can additionally or alternatively specify which standard tooling (e.g., a standard roughing endmill, a standard-size finishing endmill, a standard-size ball endmill, a standard centerdrill) and/or custom or less-common tooling (e.g., a custom keyseat cutter, a threadmill) will be loaded into a particular CNC milling machine.

The quote file can also specify material stock pricing and availability. For example, the quote file can include a schedule for price per unit length of various materials in various stock cross sections, such as a price per inch of ¼" by 4" 303 stainless steel plate, a price per foot of 6061-T6 aluminum extrusion (e.g., 80/20), and a price per ounce of polyethylene injection molding pellets, etc. The quote file can include cost per cut from material stock, which can be constant across all materials or material stock sizes or specific to a material or material stock size. For example, the quote file can include a dynamic model of cost per cut based on a coefficient for each material and a cross-sectional area of the stock, such as $0.29-per-square-inch cross-section for stainless steel, $0.15-per-square-inch cross-section for 6061-T6 aluminum, and $0.04-per-square-inch cross-section for polyethylene. The quote file can include static prices per unit length of material (i.e., prices that do not change with total amount of stock material ordered) or that are dynamic, such a based on a constant function defining an inverse relationship between price-per-unit-length of a particular stock material and total amount of the stock material for a job. Block S110 can also populate the quote file with a current real material cost—such as by retrieving commodity process for various materials from a commodities database—as well as a shipping cost for delivery of material for an order for a current number of units of the real part; Block S130 can thus implement these data to calculate a cost for the material for the order; and Block S170 can automatically submit an order for material stock at the current material price to a material distributor once the order for the unit(s) of the real part is submitted to the manufacturing facility.

Block S110 can therefore receive or retrieve a quote file containing any one or more of the foregoing static or dynamic pricing parameters or models. These pricing parameters and/or models can be defined by the manufacturing facility and then delivered to the CAD program in Block S110, such as over an Internet connection. Alternatively, the quoting plug-in (e.g., a design for manufacturability plug-in or an automated quoting plug-in) executing within a CAD program can store one or more pricing models (e.g., for different materials or for various machining centers), and Block S110—implemented by the quoting plug-in—can receive a quote file can containing coefficients for the pricing models. In this implementation, the manufacturing facility can set and/or update these coefficients, such as on a second, minute, hourly, daily, or weekly schedule, and Blocks S130, S140, etc. of the method S100 can apply these coefficients to the pricing models to generate and update a quote for manufacture of one or more units of the real part. Block S110 can thus collect current manufacturing, projected capacity, tooling, stock, machining center availability, and other relevant data for application in subsequent Blocks of the method S100 to generate and update quotes for manufacture of the real part.

A quote file can be generated automatically by the manufacturing facility. In one example, a model of production jobs at the manufacturing facility, including stock, tooling, machining center, cost, and other data, is created over time as subsequent jobs are completed; the component and total costs for these jobs are then analyzed to generate one or more pricing models (e.g., pricing algorithms) once a sufficient volume of data is collected, such as based on a target machine utilization time, target revenue or profit, target job lead time, target manufacturing capacity, etc.; and the pricing model(s) is updated over time as additional job data is collected (e.g., according to machine learning techniques) and/or as target machine utilization time, target revenue or profit, target job lead time, target manufacturing capacity, etc. are adjusted, such as manually by a representative of the manufacturing facility. Block S110 can thus receive or (actively) retrieve an updated quote file once a new quote file is published by the manufacturing facility, in response to execution of the CAD program, in response to creation of a new part file within the CAD program, in response to insertion of a new feature or geometry into the CAD file, cyclically (e.g., according to a schedule), or in response to any other event and then upload the quote file into the CAD program and/or into quoting plug-in, etc.

Block S110 can also collect a quote file that is customer-specific, such as generated according to a customer-specific pricing model based on past orders submitted by the customer and/or by similar customers (e.g., customers in a similar field, location, part order history, etc.). Subsequent Blocks of the method S100 can then implement the customer-specific quote file within the CAD program or within the quoting plug-in to auto-populate material selection, real part unit quantity, delivery time, tolerance selections, etc.

Block S110 can additionally or alternatively collect any of these data from one or more other sources, such as from a commodity database for calculation of stock material cost, from a tool or tooling supplier for estimation of cutting tool cost and fixture materials, and/or a packaging and shipping service for estimation of material acquisition cost and cost to deliver an order to the user, etc.

Block S110 can further collect location information of the workstation execution the CAD program and/or the quoting plug-in, etc.—such as based on a known location of a wireless router or Wi-Fi hotspot within wireless range of the workstation—can cross reference the location of the workstation against locations of multiple manufacturing facilities, select a particular manufacturing facility nearest the workstation, and then selectively download a quote file for the particular manufacturing facility. In this implementation, Block S110 can similarly retrieve stock material cost, shipping cost, and other manufacturing-related data for the city, state, region, country, or hemisphere, etc. in which the workstation is located. Block S110 can alternatively select a particular manufacturing from the set of manufacturing facilities based on a greatest manufacturing availability (e.g., a shortest production queue), based on a manufacturing process necessitated by a feature in the virtual model of the real part and supported manufacturing facility, and/or based any other factor or parameter.

Block S110 can therefore be implemented repeatedly throughout construction of a virtual model within the CAD program to collect new, additional, or updated manufacturing data from one or more manufacturing facilities. For example, updated quoting data can be pushed from a manufacturing to the quoting plug-in as soon as the updated quoting data becomes available, and Block S110 can receive these data, insert them into a local quoting file, and trigger Block S140 to update the manufacturing quote according to the updated quoting data. In another example, Block S110 can ping a server hosting manufacturing data of a manufacturing facility for new or updated manufacturing data in response to insertion of a new virtual feature into the virtual model of the real part. In this example, Block S110 can similarly ping the server for new or updated manufacturing data in response to insertion of a dimension, a tolerance, a material selection, and/or an order quantity, etc. into the CAD program or into the quoting plug-in. Similarly, Block S110 can cyclically ping the server for new or updated manufacturing data, such as every minute while the CAD program and/or the quoting plug-in is executing on the workstation.

However, Block S110 can retrieve the quote file and/or any other manufacturing-related data in any other form and according to any other schedule or trigger, and Block S110 can load these data into the CAD program and/or into the quoting plug-in in any other suitable way.

4. Part File

One variation of the method S100 includes Block S120, which recites initiating a part file in which a virtual model of a real part is constructed within the computer-aided drafting engine. Generally, Block S120 functions to create a new part file (and/or a new part file within an assembly file) within the CAD program, as shown in FIG. 1. Block S120 can thus prepare the part file to record a sequence of virtual geometries—such as revolved bosses and cuts, extruded bosses and cuts, swept bosses and cuts, weldments, etc.— entered by a user into the CAD program and to generate a virtual three-dimensional model from the sequence of features; Block S130, S140, etc. can thus analyze the virtual model at various stages throughout the virtual build to estimate a cost to manufacture one or more units of the real part, such as based on a material selection, a delivery schedule, and tolerances entered by the user into the part file or into the quoting plug-in.

5. Initial Quote

Block S130 of the method S100 recites, at a first time, in response to insertion of a first three-dimensional virtual geometry of the virtual model into the computer-aided drafting engine, calculating a manufacturing quote for the real part based on the first three-dimensional virtual geometry and the quote file, and Block S132 of the method S100 recites displaying the manufacturing quote within the computer-aided drafting engine. Generally, Block S130 functions to generate an initial manufacturing quote for a modeled part within the part file based on a virtual geometry inserted into the part file, and Block S132 functions to present the initial manufacturing quote to the user substantially in real-time once the virtual geometry is added to the part file and before a subsequent virtual geometry is added to the part file. For example, Block S130 can apply one or more pricing models or parameters defined in the quote file to the first virtual geometry construction within the part file to estimate a cost for the particular manufacturing facility to produce one unit, a default number of units, or a user-elected number of units of the real part in a default material according to the first virtual geometry, and Block S132 can render this quote within the CAD program or within the quoting plug-in before a second virtual geometry is added to the file, before a geometric or dimensional tolerance for the first virtual geometry is added or adjusted, or before a dimension of the virtual geometry is modified within the CAD program by the user. In another example, Block 130 postpones generation of the manufacturing quote until a material and a quantity of units of the real part is elected by the user, and Block S130 generates the manufacturing quote for manufacturing the user-elected quantity of units of the real part in the user-elected material according to substantially all virtual geometries inserted into the part file in response to selection of a material and a quantity (and a delivery time). In one implementation, Block S130 defaults to a subtractive manufacturing process (e.g., turning, milling) for manufacturing units of the real part. In this implementation, Block S130 correlates a first feature (i.e., virtual geometry) inserted into the part file—such as a revolved boss or an extruded boss—with a stock geometry for a unit of the real part, as shown in FIG. 1, and then extracts dimensions from the stock geometry to estimate a minimum material stock size from which a unit of the real part can be machined. Block S130 can further cooperate with Block S134 (described below) to predict a preferred orientation of the material stock for machining, one or more part flips, locations of tabs or other fixturing features in unit with the real part during production, and/or sizes of the fixturing features and apply these parameters to the first virtual geometry to estimate the minimum stock size for a unit of the real part to achieve reliable fixturing with sufficient material to fully realize the first virtual geometry in the unit of the real part. Based on the minimum stock size estimate, Block S130 can select a stock material of cross-section and of minimum length (accounting for a cut tolerance, such as a bandsaw cut tolerance, as specified in the quote file) for the stock material that fully encompasses the minimum stock size estimate for a unit of the real part.

In the foregoing implementation, Block S130 can further identify a preferred machining center type for machining a unit of the real part. For example, Block S130 can analyze the first virtual geometry for radial symmetry about an axis, elect a lathe for a turning operation for the real part in response to identification of radial symmetry about an axis of the first virtual geometry, and elect a mill for a milling operation for the real part in response to lack of radial symmetry about an axis of the first virtual geometry. Block S130 can further cross reference the dimensions of the first virtual geometry (e.g., length, depth, height) against machining volumes of various machining centers in operation at the manufacturing facility (as specified in the quote file) to identify one or more particular machining centers of sufficient size to machine a unit of the real part. For example, for the first virtual geometry defining a 10" by 12" by 2" rectilinear volume, Block 130 can elect a particular CNC vertical milling center with a maximum machining volume of 14" along its X axis, 12" along its Y axis, and 12 inches along its Z axis—rather than a second CNC vertical milling center with a maximum machining volume of 20" along its X axis, 16" along its Y axis, and 20 inches along its Z axis, which is sufficiently oversized for the part and is reserved for larger jobs. Block S130 can further apply a schedule of machining center availabilities (e.g., with a user-entered or default lead time period) and materials designed for particular machining centers (e.g., aluminum, steel, or plastic) to elect a particular machining center or group of machining centers operational within the manufacturing facility to machine one or more units of the real part. From these calculated or predicted parameters, Block S130 can then predict a setup time and a machining time for a unit of the real part.

In the foregoing implementation, unless the user has entered a material, a unit quantity, and/or a delivery time for the order, Block S130 elects a default number of units (e.g., a single unit) of the real part in a default material (e.g., 6061-T6 aluminum) with a default lead time (e.g., two weeks). Block S130 then merges models and/or parameters defined within the quote file—such as cost per unit length of material, demand for the machining center, and tooling availability—with the unit quantity for the order, the material, the delivery time, the part stock size, the predicted per-unit setup time, the predicted per-unit machining time, etc. to calculate a cost to fulfill the order. Block S132 can then display this manufacturing quote substantially in real-time within the CAD program and/or within the quoting plug-in, such as in a currency selected by the user.

In one example, Block S130 applies the data contained within the quote file to the first virtual geometry inserted into the part file and user-entered or default material, quantity, and/or delivery time, etc. to estimate a cost to the manufacturing facility to acquire the stock materials to machine the quantity of units of the real part, to machine the units of the real part, and to ship the units to the user's location (or other user-elected location or shipping address). In this example, Block S130 can cooperate with Block S110 to retrieve costs for material stock from a material supplier, to retrieve an estimate from a shipping service for packing and shipping the stock to the manufacturing facility, and to retrieve an estimate from a shipping service for packing and shipping the completed units of the part to the user or affiliate. Block S130 can also implement static costs or cost models—defined in the quote file—to estimate a cost for cutting material stock to size for a single unit or for nested units of the real part, a cost for setting up a machining center with tooling, a cost for generating a toolpath and installing the toolpath on the machining center, depreciation of the machining center during operation to machine the quantity of units of the real part, purchase cost and/or depreciation of tooling to machine the quantity of units of the real part, electricity cost for machining the units of parts under projected tool loads throughout the projected toolpath, etc.; Block S130 can then sum these costs across the full order for the quantity of the real part to generate a comprehensive prediction for the cost of the order to the manufacturing facility. In this example, Block S130 then applies a target margin for the manufacturing facility—such as defined in the quote file—to transform the total production cost estimate for the manufacturing facility into a cost estimate for the user; and Block S132 can then present this cost estimate for the user within a user interface with the CAD program or within the quoting plug-in.

In the foregoing implementation, Block S130 can also prompt the user to select a material, a preferred manufacturing method, a lead time or delivery window, a total quantity of units of the real part in the order, and/or any other relevant parameters for the real part of for the order, and Block S130 can recalculate or modify the manufacturing quote accordingly based on the first virtual geometry inserted into the part file, such as shown in FIG. 1. In one example, Block S130 automatically adjusts the manufacturing quote in response to subsequent adjustment of the number of units of the real part for order (e.g., from one unit to 37 units), adjustment of the part material (e.g., from 6061-T6 aluminum to 303 stainless steel), and/or adjustment of the lead time (e.g., from two weeks to nine days) by the user, such as within the same CAD modeling session or in a later CAD modeling session. In another example, a user elects injection molding—rather than machining—as a preferred manufacturing method for the real part, and Block S130 recalculates the manufacturing quote based on an estimated cost to create a mold based on the virtual feature (and other features), to optimize fluid flow through the mold, to install the mold in an injection molding machine, and to prepare the injection molding machine for production. In this example, Block S132 then replaces the machining-based manufacturing quote previously displayed with the injection molding-based quote. In this example, the user can then enter a part order quantity, and Block S130 can estimate a total time, plastic pellet weight, and manual trimming time, etc. to manufacture the quantity of units of the real part update the quote accordingly.

Alternatively, Block 130 can predict a manufacturing process for the real part based on the (first) virtual geometry inserted into the part file, such as milling for a rectilinear extrusion with square faces, turning for a revolved boss, sheetmetal bending for sheetmetal features and/or weldments, injection molding for stock geometries featuring draft angles and paired with selection of a thermoform plastic, sand casting for large stock geometries featuring draft angles and paired with selection of an aluminum-alloy or copper-alloy material, investment casting for small stock geometries featuring draft angles and paired with selection of an aluminum-alloy or copper-alloy material, forging for stock geometries featuring draft angles and paired with selection of a steel-alloy material, etc.

Block S130 can also identify multiple manufacturing methods both supported by the manufacturing facility and viable for manufacture of the real part according to the first virtual geometry constructed within the CAD program, and Block S130 can calculate a cost to manufacture a particular (e.g., a default, a user-elected) quantity of the real part with each viable manufacturing method; Block S132 can then display each of these manufacturing method-specific costs for the user. Block S130 can also generate a quantity-dependent cost model for each viable manufacturing method for the real part, calculate a total cost to manufacture a quantity of units of the real part selected by the user, and elect a particular manufacturing method—from the set of viable manufacturing methods—that yields a lowest total cost. For example, Block S130 can determine: that producing fewer than 83 units of a small, highly-detailed and contoured plastic part on a five-axis milling center is less expensive than injection molding the real part; that producing 84 to 519 units of the part by injection molding the real part with a single-cavity mold is less expensive than machining on a five-axis milling center or molding with a multi-cavity injection mold; and that producing more than 519 units of the part by injection molding the real part in a multi-cavity mold is less expensive than machining on a five-axis milling center or molding with a single-cavity injection mold. In this example, Block S130 can thus elect a particular manufacturing process and/or tooling to substantially minimize cost for a quantity of the real part elected by the user, and Block S132 can present—to the user—a graphical representation of the manufacturing costs per unit for these three manufacturing methods.

Block S130 can similarly elect a particular manufacturing method for the real part based on a delivery requested by the user. For example, Block S130 can determine: that fewer than 1304 units of the small, highly-detailed and contoured plastic part on a five-axis milling center can be produced in less time than necessary to manufacture a single-cavity mold and produce the same quantity of parts; that 1305-1688 units of the part can be produced by injection molding with a single-cavity mold in less time than necessary to manufacture a multi-cavity mold and produce the same quantity of parts; and that producing more than 1689 units of the part by injection molding the real part in a multi-cavity mold requires less than producing the same quantity of parts through conventional machining or injection molding with a single-cavity mold, such as based on a current manufacturing schedule for the manufacturing facility and a projected time to produce and test injection molding tooling.

Block S130 can similarly predict a material for the part, such as based on a stock geometry and/or a virtual geometry inserted into the part file, and generate or update the manufacturing quote accordingly. For example, Block S130 can predict selection of and/or recommend a 304-series stainless steel in response to insertion of a weldment feature within the part file, and Block S130 can predict selection of and/or recommend a 303-series stainless steel in response to insertion virtual geometry indicating a turned or milled part. In this example, Block S130 can also access a customer file, determine that the customer (i.e., the user) has worked in medical devices, and thus predict selection of and/or recommend a medical-grade 316L-series stainless steel for the real part. Furthermore, in this example, Block S130 can recommend alternative material types and grades based on availability and/or cost of stock materials in various stock geometries or cross-sections. Block S140 can additionally or alternatively update the material prediction and/or recommendation for the real part as additional geometry features are added to the part file and then update the manufacturing quote accordingly.

In a similar implementation, Block S130 predicts (or recommends) a material for the real part based on a constraint or part description entered by user. For example, Block S130 can prompt the user to enter a use or description for the virtual model of the real part in the part file, such as "motor mount for one-horsepower motor [ACME MOTORS Model No. AM-008293] with [C] bolt mounting pattern," and Block S130 can thus determine suitable material of a suitable thickness for the part. In this example, Block S130 can access a datasheet for the specified ACME MOTORS Model No. AM-008293, extract a maximum torque from the datasheet, select a material and thickness suitable for the maximum motor torque, extract the [C] bolt pattern from the datasheet, and automatically insert the extracted bolt pattern into the part file. In this example, Block S130 can select the material and material thickness based on a default or a user-selected factor of safety, a maximum deflection of the part at peak load (i.e., maximum motor torque), a length or width of the part, projected engagement of the motor with the real part, etc. Block S130 can also identify multiple suitable materials, calculate corresponding minimum thicknesses of the real part for the various suitable materials, and prompt the user to select a particular material from a list of the suitable materials and/or to select a particular thickness from a list of the minimum thicknesses. In this example, Block S130 can also automatically generate a part file for the user-selected motor, automatically download a part file for the motor from a manufacturer or supplier database, and/or generate a bill of materials, such as including the motor and bolts, screws, washers, nuts, and other mounting hardware to assembled the motor on the modeled part. However, Block S130 can function in any other way to receive, select, or identify a suitable material for the part in the part file.

In one implementation, Block S130 calculates the manufacturing quote according to a default tolerance for the first three-dimensional virtual geometry inserted into the part file, such as ±⅛" for weldments; ±0.02" for material stock; ±0.005" for machining surfaces; and ±0.0005 for bearing surfaces, dowels, and press fits. Block S130 can also prompt the user to enter a tolerance on a dimension of the first virtual geometry, and Block S130 can generate or modify the manufacturing quote if the entered tolerance is tighter or more relaxed than a corresponding default tolerance. For example, Block S130 can apply geometric dimensioning and tolerancing principles to the virtual mode to select a (lowest-cost, most available, etc.) tooling and machining center combination sufficiently necessary to achieve the user-elected tolerance, such as to achieve the tightest tolerance specified in the virtual model for the real part. In this example, Block S130 can extract modeled, measured, or factory-specified spindle run-out, table parallelism, encoder resolution, and/or other specifications of a machining center operating within the manufacturing facility—as well as with dimensions and tolerances of new or reground tooling and machine tool setup metrology equipment (e.g., edge finders, probes)—from the quote file to calculate a tolerance window for one or more combinations of machining centers, tooling, metrology, and/or fixturing setups. Block S130 can then generate the manufacturing quote for the order based on a particular machining center (or type or group of machining centers), cutting tools, metrology equipment, and/or fixturing setups sufficient to achieve the entered tolerance, such as within a threshold confidence.

In another implementation, Block S130 calculates the manufacturing quote for a unit of the real part based on a total virtual surface area of the first three-dimensional virtual geometry of the virtual model and a relationship between manufacturing cost and total part surface area defined in the quote file. For example, Block S110 can retrieve—from the manufacturing facility—a first algorithm for conventionally milled parts and a second algorithm for conventionally turned parts, the first algorithm defining a relationship between a cost to mill a unit of a real part and a ratio of the total surface area of the part to the total volume of the real part, and the second algorithm defining a relationship between a cost to turn a unit of a real part and a ratio of the total surface area of the part to the total volume of the real part. In this example, Block S110 can also collect various material-based coefficients, quantity-based coefficients, and/or delivery time-based coefficients, etc. for the algorithms. As described above, Block S130 can select either the first algorithm or the second algorithm based on a determined manufacturing method of the real part—based on the first virtual geometry inserted in to the part file—and then selectively apply the material-, quantity-, and/or timing-based coefficients and a calculated ratio of virtual surface area to virtual volume of the virtual model to the selected algorithm to generate an estimated cost to machine the quantity of units of the real part. In this example, Block S130 can further cooperate with Block S134, etc. to calculate a tooling cost for the order and combine this fixed tooling cost with the estimated cost to machine the quantity of units to calculate a total cost to manufacture the quantity of the real part.

6. Updated Quote

Block S140 of the method S100 recites, at a second time succeeding the first time, in response to insertion of a second three-dimensional virtual geometry of the virtual model into the computer-aided drafting engine, updating the manufacturing quote displayed within the computer-aided drafting engine based on the second three-dimensional virtual geometry and the quote file. Generally, Block S140 functions to update the manufacturing quote for production of one or more units of the real part according to features defined in the virtual model as additional features are inserted into the part file. For example, Block S140 can correlate a virtual geometry inserted into the part file with an additional manufacturing (e.g., machining) operation, predict a cost associated with the additional manufacturing operation, and update the manufacturing quote to reflect the additional manufacturing operation, such as by implementing any of the techniques or methods described above. In a similar example, Block S140 can correlate a virtual geometry inserted into the part file with an additional section of a toolpath calculated, generated, or predicted for one or more virtual geometries previous entered into the virtual model, predict a cost associated with additional tool wear, machining center depreciation, etc. extending from the additional section of the toolpath, and update the manufacturing quote to reflect these additional costs.

In one implementation, Block S130 includes, at the computer-aided drafting engine, electing a first cutting tool from a list of standard cutting tools supported by the manufacturing facility based on the first three-dimensional virtual geometry inserted into the virtual model, estimating a first machining time to machine a unit of the real part with the first cutting tool according to the first three-dimensional virtual geometry, and calculating an initial manufacturing quote for the unit of the real part based on a cost of the first cutting tool and the first machining time. In this implementation, Block S140 similarly includes, at the computer-aided drafting engine, electing a second cutting tool from the list of standard cutting tools based on the second three-dimensional virtual geometry, estimating a second machining time to machine the unit of the real part with the second cutting tool according to the second three-dimensional virtual geometry, and updating the manufacturing quote based on a cost of the second cutting tool and the second machining time.

In one example of the foregoing implementation, Block S130 identifies a rectilinear extruded geometry of the real part from the first virtual geometry inserted into the virtual model, elects a material stock size, elects a first endmill for machining rough material stock, calculates a machining time to cut the rough material stock down to the rectilinear extruded geometry with the first endmill, and generates a quote to manufacture a unit of the real part accordingly. Subsequently, Block S140 adjusts the manufacturing quote in response to insertion of a virtual bore inserted into the rectilinear extruded geometry in the virtual model. In this example, Block S140 identifies the virtual bore as a blind square-shouldered bore, selects a second under-sized center-cutting endmill for creating a comparable bore in the real part, estimates a time for the machining center to exchange the first endmill for the second endmill, estimates a time to cut the blind square-shouldered bore with the second endmill, and calculates a per-unit cost to create the bore in the real part based on the foregoing times and a cost (or depreciation) of the under-sized center-cutting endmill. In this example, Block S140 then updates the manufacturing quote by adding the per-unit cost to create the bore in the real part—multiplied by a number of units of the real part in the order—to the manufacturing quote generated in Block S130.

In a similar example, Block S140 correlates a second feature inserted into the virtual model with a counterbore through-hole, estimates a time for the machining center to select a centerdrill and center drill the hole, estimates a time for the machining center to select a twist drill and to complete a pecking operation with the twist drill, estimates a time for the machining center to select an undersized endmill and to create a counterbore with the endmill, and calculates a per-unit cost to create the counterbore throughhole bore based on the foregoing times and associated tooling costs. In this example, Block S140 then updates the manufacturing quote accordingly. For multiple similar bores or threaded holes in a single unit of a real part, Block S140 can also calculate a cost to move a unit of the part to a secondary machining center—such as to a dedicated CNC drilling and tapping machine—calculate a cost to complete the cycled machining operation at the secondary machining center, compare this per-unit cost with a cost to complete a similar operation at a more generic machining center, and update the manufacturing quote according to a lowest cost and/or to a faster turnaround time for the order.

In another example implementation, in which Block S130 identifies a rectilinear extruded geometry of the real part from the first virtual geometry and generates an initial quote to manufacture a unit of the real part according to the rectilinear extruded geometry, Block S140 adjusts the manufacturing quote based on a pocket feature inserted into the virtual model. In one example, Block S140 identifies a pocket inserted into a stock geometry within the part file, determines a maximum standard endmill size to complete the corresponding pocketing operation, calculates a machining time for the pocketing operating with an endmill of the maximum standard size, and updates the manufacturing quote with the corresponding cost. In this example, Block S140 can also estimate a cost to remove material from the pocket with a centerdrill (e.g., including tooling setup times and tool changes) and to then finish the pocket with a finishing endmill. Block S140 can thus identify a more (or "most") cost-effective machining option for machining a unit of the part according to the second feature of the virtual model, adjust the manufacturing quote accordingly, and note the selected machining option for the second feature in the manufacturing quote and/or in the part file.

Figure 4:
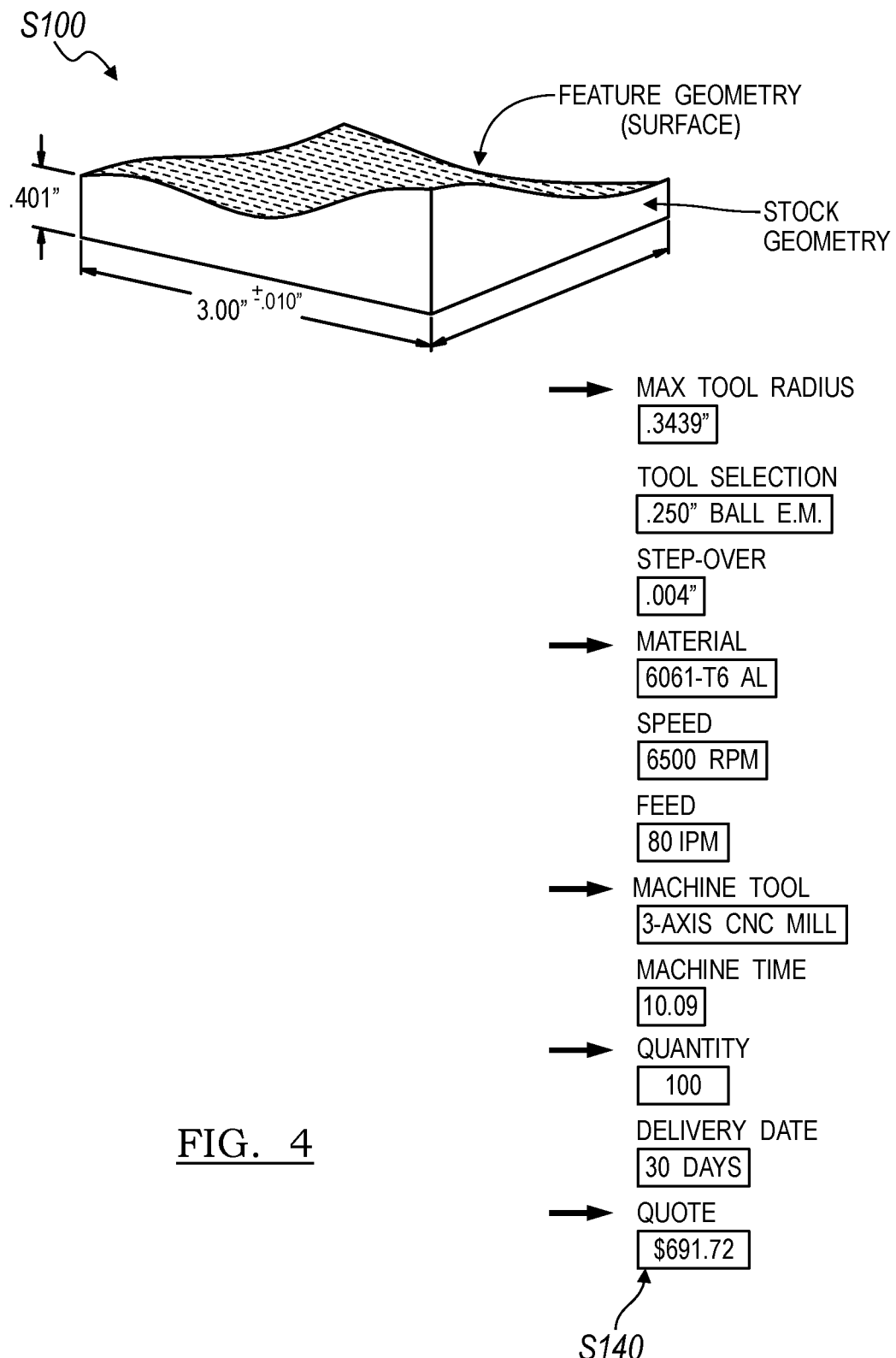
FIG. 4 is a graphical representation of one variation of the method.

In yet another example implementation, Block S140 adjusts the manufacturing quote based on a virtual compound surface inserted into the virtual model of the real part, as shown in FIG. 4. In one example, Block S140 calculates a derivative of the virtual compound surface and selects a maximum ball endmill diameter to machine a unit of the real part according to the virtual compound surface. Block S140 then estimates a machine time for the compound surface based on the maximum ball endmill size and a default stepover-to-endmill diameter ratio specified in the quote file and/or specified by the user and updates the manufacturing quote accordingly. In this example, Block S140 can also select an alternative machining center to complete the surfacing operation in particular and/or to complete all machining operations for the real part. For example, Block 130 can initially elect a standard three-axis CNC milling machine to machine the real part according to a relatively basic rectilinear geometry of the first feature of the virtual model; Block S140 can then elect a five-axis CNC milling machine to perform all machining operations on the real part—rather than the three-axis CNC milling machine—in response to insertion of the virtual compound surface into the virtual model. Block S140 can then update the manufacturing quote for both machining operations corresponding to both the first virtual geometry and the second virtual geometry.

As described below, Block S140 can further update a fixturing callout generated in Block S130 described above to accommodate additional virtual geometries added to the part file during virtual construction of the virtual model within the CAD program. In one example, Block S140 predicts part stability during a machining operation and modifies machining tab dimensions and locations defined in Block S130 based on a new virtual geometry added to the part file; Block S140 then recalculates the manufacturing quote for the order accordingly for the first and second (and other) virtual geometries. In another example, Block S140 elects an alternative fixturing method based on an anticipated change in part stability during machining arising from one or more additional virtual geometries inserted into the virtual model. In this example, Block S140 can further cooperate with Block S144 to create a fixturing schedule for the real part, to estimate a cost to fabricate the fixture(s) and to execute the fixturing schedule (e.g., based on tooling fabrication, setup, part flips, etc.), and to update the manufacturing quote accordingly. In this example, Block S140 can cooperate with Block S144 to elect a custom machined fixture, a common fixture plate, a vacuum plate, soft jaws, hard jaws, a polymer-based support filler, or other common fixture type sufficient to constrain a unit of the real part during machining. Blocks S130, S134, S140, and S144 can also cooperate to generate an additional part file for a custom or modified fixture, to generate a corresponding quote, and to update the fixture part file and the corresponding quote as additional virtual geometries are added to the part file, as described below.

Furthermore, as additional virtual geometries (i.e., virtual features) are added to the virtual model within the part file, Block S140 can analyze the complete (i.e., whole) virtual model rather than solely a newest virtual geometry in order completely reassess a cost to manufacture a unit of the part (or a batch of units of the part) according to all current features within the virtual model. In particular, Block S140 can repeat methods and processes of Block S130 described above but now in the context of one or more subsequent features inserted into the virtual model, such as to identify possible changes in spindle speed, feed rate, tooling type, machining center or machining center type, fixturing, part flip order, machining method (e.g., turning, milling, die casting, sandcasting, or injection molding), etc. or other manufacturing parameters for the real part necessitated by the additional one or more features. Block S130 can similarly reassess the full virtual model in response to insertion of an additional virtual geometry into the virtual model to modify the manufacturing pan for the real part to reduce manufacturing time, necessitate fewer resources (e.g., reduce a callout for material stock size), etc. to thus reduce total and/or per-unit part cost for the order. For example, for a virtual pocket feature added to the virtual model over a compound surface, Block S140 can adjust a surfacing operation toolpath for the compound surface to now feature an increased feed rate and/or an increased stepover distance across the pocket in order to reduce total time for the surface operation, which may reduce cost of the surface operation without affecting surface finish of the final part; Block S140 can then update the manufacturing quote according to the reduced machining time for a unit of the real part.

Block S130 can implement similar functionality to update a predicted material stock geometry and a corresponding cost per unit of the real part as additional virtual geometries are added to the part file. For example, in response to insertion of a second extruded feature onto a first extruded feature within the virtual model, Block S130 can determine that the overall dimensions of the part has grown, identify a material stock of sufficient cross-section and length to accommodate the final three-dimensional geometry of the real part, calculate a new per-unit cost for stock material, update the manufacturing quote accordingly.

Like Block S130, Block S140 can also predict or prompt the user to enter a tolerance requirement for a new virtual geometry and estimate a cost of the new virtual geometry accordingly, such as described above. Block S140 can thus recalculate a manufacturing quote for a single virtual geometry, a set of virtual geometries, or for all geometries of the virtual model based on insertion of a tolerance, modification of a tolerance, insertion of a dimension, and/or modification of a dimension in one or more virtual geometries within the virtual mode. For example, after insertion of the first virtual geometry into the virtual model (e.g., at a fourth time succeeding the first time), in response to insertion of a dimensional tolerance of the first virtual geometry into the CAD program, Block S140 can update the manufacturing quote displayed within the computer-aided drafting engine based on the new dimensional tolerance elected for the first virtual geometry.

7. Visual Representation of Cost

In one implementation, Block S130 calculates a first cost to manufacture the real part according to the first three-dimensional virtual geometry, and Block S132 renders a virtual surface of the first three-dimensional virtual geometry in a first color corresponding to the first cost in Block S132. In this implementation, Block s140 calculates a second cost to manufacture the real part according to the second three-dimensional virtual geometry and renders a virtual surface of the second three-dimensional virtual geometry in a second color corresponding to the second cost, the second color different from the first color. In this implementation, Blocks S132 and S140 cooperate to color code surfaces of the virtual model according to projected costs to create replicate corresponding virtual geometries of the virtual model in a unit of the real part. For example, Blocks S130 and S140 can cooperate to order costs to create each surface in a unit of a real part according to the current virtual geometry of the virtual model, to assign a spectrum of colors to the ordered costs (e.g., red for a highest cost per surface, blue for a lowest cost per surface), and to apply the spectrum of colors to surfaces in the virtual model according to the color-cost assignments. In a similar example, Blocks S130 and S140 cooperate to order costs to create each surface in a unit of a real part per unit area according to the current virtual geometry of the virtual model, to assign a spectrum of colors to the ordered costs per unit area (e.g., red for a highest cost per unit surface area, blue for a lowest cost per unit surface area), and to apply the spectrum of colors to surfaces in the virtual model according to the color-cost assignments. Blocks S130 and S140 can similarly cooperate to calculate costs for each discrete geometry or feature added to the virtual model, and Blocks S132 and S140 can color code surfaces and/or volumes of these discrete geometries or features accordingly. For example, Block S130 can tabulate a cost of $1.22 for a 0.25" by 4.0" by 4.0" aluminum plate in response to insertion of a first virtual geometry into the part file; Block S140 can recalculate the cost for the material stock as of $2.77 for a 0.50" by 4.0" by 4.0" aluminum plate in response to a 0.23" virtual boss constructed onto a broad face of the first virtual geometry in the part file; Block S132 can thus render the surfaces and/or volume of the first virtual geometry in yellow, Block S140 can render the surface and/or volume of the boss in orange, and Blocks S132 and S140 can cooperate to populate a key depicting the projected $1.22 cost for the stock material corresponding to the first virtual geometry and depicting the projected additional cost of $1.55 to create a boss in a unit of the real part corresponding to the virtual boss. Blocks S132 and S140 can thus cooperate to provide a visual representation to the user of cost to manufacture a unit of the part according to each discrete feature or group of features inserted into the virtual model.

8. Risk

In another implementation, Block S130 includes estimating a first failure risk for manufacturing a unit of the real part according to a first three-dimensional virtual geometry and a manufacturing history of the manufacturing facility and calculating the manufacturing quote for the real part based on the first failure risk; Block S132 includes rendering a virtual surface of the first three-dimensional virtual geometry in a first color corresponding to the first failure risk; and Block s140 includes estimating a second failure risk for manufacturing the unit of the real part according to a second three-dimensional virtual geometry and the manufacturing history of the manufacturing facility, updating the manufacturing quote for the real part based on the second failure risk, and rendering a virtual surface of the second three-dimensional virtual geometry in a second color corresponding to the second failure risk, the second color different from the first color. In this implementation, Blocks S130 and S140 cooperate to apply a manufacturing history of the manufacturing facility to features in the virtual model to calculate a risk in attempting to create a feature or surface in a unit of the real part according to a virtual geometry inserted into the virtual model, to associate a cost with this risk, and to generate or modify the manufacturing quote for the order according to this cost.

In the foregoing implementation, Block S110 retrieves the quote file that specifies risk values for various common machining operations based on a history of operation failure and success by the manufacturing facility. In this example, the quote file can specify, for stainless steel: a 0.03% risk of failure for machining a vertical planar surface within a ±0.005" tolerance; a 0.08% risk of failure for machining a horizontal planar surface within a ±0.005" tolerance; a 9.8% risk of failure for drilling bores less than −0.60" in diameter; a 2.9% risk of failure for drilling bores between 0.060" and 0.25" in diameter; a 5.9% risk of failure for drilling bores greater than 0.25" in diameter; a 22% risk of failure rate for features exhibiting ratios of surface area to thickness greater than 80 (e.g., a "thin wall"); and a 12.6% risk of failure for tapping threads with greater than 70% thread engagement. In this example, the quote file can define similar failure risks for other common materials, such as mild steel, aluminum, and plastic. The quote file can additionally or alternatively include parameterized risk values, such as in the form of an algorithm into which dimensions, tolerances, order quantities, and/or other features of the virtual model or the order can be inserted to calculate risk of failure of the real part. For example, a failure risk for machining a particular type of feature in a unit of the real part may be inversely proportional to a quantity of units of the real part to be manufactured.

Block S130 can characterize or qualify types of surface or features in the initial virtual geometry, such as by associating each face or vertical face or feature in the virtual model with one of vertical face machining, horizontal face machining, surfacing, tapping, drilling, chamfering, pocketing, keyseat cutting, etc. Block S130 can then reference these surface or feature characterizations against risk values from the quote file—such as for the default or user-elected material—to determine a risk for each surface or feature and sum (or otherwise combine) these risks to predict a probability of failure of a unit of the real part during production. For example, for a total calculated failure risk of 3.9% for the real part for a quantity of 100 units of the real part in the order, Block S130 can predict that 3.9% of units will fail or not meet required specifications or tolerances; Block S130 can thus generate a manufacturing quote for 104.05 units of the product ([100 units]/[96.1% success rate]) to compensate for the predicted failure rate for manufacture of the real part. Block S130 can also apply a failure safety factor to the manufacturing quote, such as by applying an additional predicted failure rate of 2% for orders of 1 to 99 units, 1% for orders of 100 to 999 units, 0.5% for orders of 1,000 to 9,999, and 0.1% for orders of more that 10,000 units. Block S130 can thus generate a manufacturing quote for an order of one or more units of the real part that accounts for probability of failure of a unit of the real part during manufacture based on historical manufacturing data collected by the manufacturing facility over time during fulfillment of various other orders.

Block S140 can then implement similar methods or techniques in response to insertion of a second virtual geometry into the virtual model to update the risk estimate for manufacture of a unit of the real part. As described above, Block S140 can analyze the second virtual geometry solely or assess the whole of the virtual model to generate a new estimate of failure risk of manufacture of the real part and to adjust the manufacturing quote accordingly.

Block S132 and S140 can then cooperate to visually present risk assessments for each surface or feature of the virtual model through the CAD program and/or through the quoting plug-in. For example, Blocks S132 and S140 can highlight surfaces and/or volumes within the virtual model according to the assessed failure risk of each, such as according to a color risk scale with red indicating a highest risk and blue indicating a lowest risk. Blocks S132 and S140 can thus cooperate to color code the points, line, areas, and/or volumes of the virtual model and to present a key to the user to indicate risk value substantially in real-time during construction of the virtual model within the CAD program, and Block s140 can continually repeat to update risk assessments and corresponding color codes within virtual model, such as in response to insertion of each additional virtual geometry, tolerance, dimension, etc. into the virtual model, the CAD program, or the quoting plug-in.

9. Delivery Time and Unit Quantity

As shown in FIG. 1, one variation of the method S100 further includes Block S150, which recites, at the computer-aided drafting engine, receiving a selection for a delivery time of a unit of the real part and updating the manufacturing quote according to the selection for the delivery time and a current manufacturing schedule of the manufacturing facility specified in the quote file. Furthermore, as shown in FIG. 1, one variation of the method S100 further includes Block S160, which recites, at the computer-aided drafting engine, receiving a quantity of units of the real part for order and updating the manufacturing quote according to the quantity of units of the real part for order. Generally, Blocks S150 and S160 function to update the manufacturing quote based on a delivery time (or delivery window) and an order quantity selected by the user, respectively. For example, Blocks S150 and S160 can cooperate to calculate or update the manufacturing quote for the real part based on a current manufacturing schedule of the manufacturing facility, an availability of the default or user-elected material for the real part, and/or a delivery time of the quantity of units of the real part entered into the CAD program (e.g., computer-aided drafting engine). Block S150 can receive—from the user through the quoting plug-in or the CAD program—a shorter or longer lead time selection for delivery of the order, and Block S150 can merge a machining center utilization schedule, a shop hours schedule, material stock availability and lead times, etc. to trigger a warning if an entered lead time is too short. Block S150 can also select a particular production period for the order and estimate or adjust a projected production cost during the production period based on a future machining center utilization schedule of the manufacturing facility.

In one implementation, Block S150 accesses a schedule of current, confirmed, and/or projected projects for the manufacturing facility from the quote file collected in Block S110, and Blocks S150 and S160 cooperate to select one or more manufacturing operations and machining centers to complete all units of the part order based on tooling and machining center availability between the current time and a specified final delivery time. For example, if the quote file indicates that a single five-axis milling machine is operational within the manufacturing facility but that the single five-axis milling machine is projected to be fully utilized for fulfillment of an order previously submitted and still pending completion, Block S150 and S160 can elect an alternative three-axis milling machine to complete manufacture of units of the real part, specify one or more additional part flips for production of units of the real part, and adjust the manufacturing quote accordingly. In this example, Block S150 can also prompt the user to select an alternative delivery window that falls after the pending order to reduce cost for the new order, and Block S150 can display an alternative manufacturing quote corresponding to the alternative delivery window within the prompt, such as in addition to manufacturing quote for the original delivery date or window selected by the user.

Figure 3:
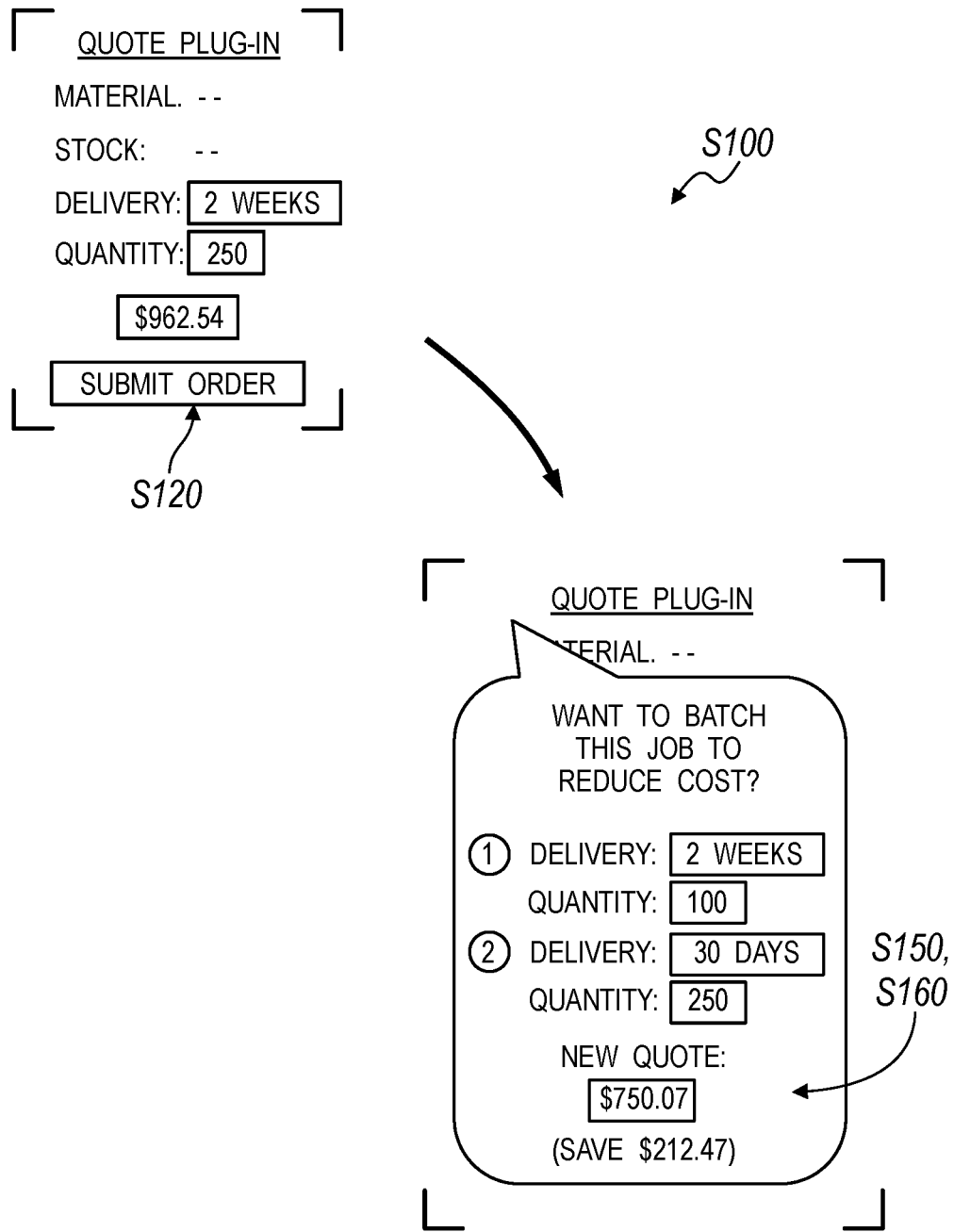
FIG. 3 is a flowchart representation of one variation of the method.

In the foregoing example, S160 can alternatively determine that only a portion of the part quantity can be fulfilled on the five-axis milling machine due to allocation of the five-axis milling machine for another pending project. Thus, Blocks S150 and S160 can cooperate to display the threshold quantity of units of the real part that can be allocated to the five-axis milling machine, calculate and display a corresponding manufacturing quote for the threshold quantity of units, and prompt the user to select a quantity of units less than or equal to the threshold part count in order to achieve the delivery date of window elected by the user. Blocks S150 and S160 can similarly prompt the user to batches orders of units of the real part—including two or more batches of units with different delivery dates or windows—based on machining center availability over time, and Block S150 and S160 can display manufacturing quotes for each batch, such as in comparison to a manufacturing quote for the full part order quantity, as shown in FIG. 3.

However, Blocks S150 and S160 can apply any of the foregoing techniques or any other suitable method, model, or data to update the manufacturing quote based on a delivery date selection and a part order quantity selection, respectively.

10. Fixturing

As shown in FIG. 2, one variation of the method S100 includes Block S134, which recites at a first time, in response to insertion of a first three-dimensional virtual geometry of the virtual model into the computer-aided drafting engine, predicting a fixturing method for the real part based on the first three-dimensional virtual geometry. Generally, Block S134 functions to automatically determine a suitable fixturing method for manufacturing a unit of the real part according to one or more geometries defined within the virtual model and to update the manufacturing quote according to the determined fixturing method.

In one implementation in which Block S130 identifies the real part as suitable for machining with a three-axis vertical milling center, Block S134 can calculate projected costs to machine one unit of the real part with various different fixture setups; Block S134 can then elect a particular fixturing method for the quantity of units of the real part according to these fixturing-related costs. In particular, Block S134 can calculate a first cost to manufacture one or the quantity of units of the real part with a standardized fixture (e.g., hard jaws, a vacuum surface plate), can calculate a second cost to manufacture one or the quantity of units of the real part with a custom fixture (e.g., soft jaws, a custom fixture plate), and then select the real custom fixture over the standardized fixture in response to the first cost exceeding the second cost, or vice versa. For example, Block S134 can estimate a time to load a material stock for a unit of real part (e.g., material stock of a suitable size determined in Block S130) into a vice with hard jaws and a time to locate an origin and/or an orientation of the material stock within the vice for a first machining orientation on the unit; for a real part requirement one or more part flips, Block S134 can further estimate a time to flip the unit to a subsequent machining orientation following a first machining orientation, a time to load the unit into a vice with hard jaws, and a time to then locate an origin and/or an orientation of the material stock within the vice for a subsequent machining orientation for each determined part flip. Block S134 can then sum these setup times to predict a total per-unit setup time for machining a unit of the real part with a hard jaw fixturing method, transform this time into a per-unit setup cost for machining the real part with the hard jaw fixturing method based on a setup time cost value stored in the quote file, and thus calculate a total setup cost for all units of the real part specified for the order. In this example, Block S134 can also: determine if soft jaws are suitable for the size and geometry of the real part; automatically generate a virtual model of a soft jaw geometry suitable for constraining material stock during machining of a unit of the real part; calculate or retrieve a material cost for a set of soft jaws of appropriate size for the virtual model of the soft jaw geometry; calculate a machining time—and a corresponding machining cost based on the quote file—for producing a set of soft jaws according to the virtual model of the soft jaw geometry (such as similar to techniques executed in Block S130 described above); calculate a setup time—and a corresponding setup cost based on the quote file—for installing the soft jaws in a machining center and determining an origin and/or an orientation of the soft jaws; and calculate a setup time—and a corresponding setup cost based on the quote file—for installing material stock in the soft jaws prior to machining. Block S134 can repeat these steps for each machining orientation, such as if multiple soft jaws are needed to produce a unit of the real part, and Block S134 can then sum these costs across the total number of units of the real part specified in the order to estimate a total setup cost for machining the total quantity of units of the real part in the order with a soft jaw fixturing method. Furthermore, in this example, Block S134 can apply similar methods and techniques to: determine if a single fixture plate is suitable for the size and geometry of the real part; automatically generate a virtual model of a fixture plate geometry suitable for constraining material stock during machining of a unit of the real part; calculate or retrieve a material cost for a fixture plate of appropriate size for the virtual model of the fixture plate geometry; calculate a machining time—and a corresponding machining cost based on the quote file—for producing a fixture plate according to the virtual model of the fixture plate geometry (such as similar to techniques executed in Block S130 described above); calculate a setup time—and a corresponding setup cost based on the quote file—for installing the fixture plate in a machining center and determining an origin and/or an orientation of the fixture plate within the machining center; and calculate a setup time—and a corresponding machining cost based on the quote file—for installing material stock on the fixture plate prior to machining. Block S134 can repeat these steps for each machining orientation, such as if multiple fixture plates are needed to produce a unit of the real part, and Block S134 can then sum these costs across the total number of units of the real part specified in the order to estimate a total setup cost for machining the total quantity of units of the real part in the order with a fixture plate fixturing method. Block S134 can then cooperate with Block S130 to combine a total setup cost for machining the total quantity of units with each fixturing method to calculate a manufacturing quote for each suitable fixturing method. Block S132 can then present the manufacturing quote for each suitable fixturing method through the user interface in the CAD program or within the quoting plug-in, such as in conjunction with a projected lead (i.e., delivery) time for the order produced according to each of the fixturing methods; and Block S170 can receive from the user a selection for a particular manufacturing method and corresponding lead time and manufacturing quote from the set of manufacturing quotes thus presented to him in Block S132. Alternatively, Block S134 can select a particular manufacturing quote corresponding to a lowest cost and/or to a shortest lead time for the order for presentation to the user in Block S132.

Furthermore, in the foregoing example, Block S130 can estimate a cost to machine the quantity of units of the real part on a five-axis machining center, and Block S134 can cooperate with Block S130 to calculate elect the five-axis machining center for production of the real part in response to the cost of all fixture methods for the three-axis machining center exceeding the cost for machining the quantity of real parts with the five-axis machining center, and vice versa.

Block S134 can therefore generate a virtual model of a real custom fixture for machining a unit of the real part, calculate a materials cost for the real custom fixture based on the virtual model, calculate a machining time for the real custom fixture based on the virtual model, and calculate a total cost for the real custom fixture based on the materials cost and the machining time for the real custom fixture; from these data, Block S134 can cooperate with Block S130 to calculate the manufacturing quote for the real part based on the cost for the fixturing method and a cost to manufacture the real part according to the first virtual geometry inserted into the part file. Block S134 can also store the virtual model of the custom fixture, and Block S170 can transmit the virtual model of the custom fixture with the virtual model of the real part and accompanying order parameters to the manufacturing facility once the order is submitted by the user. Block S134 can also link geometries, dimensions, and/or tolerances of the virtual model of the custom fixture to geometries, dimensions, and/or tolerances of the virtual model of the real part such that the virtual model of the custom fixture is automatically updated in response to changes to a geometry, dimension, and/or tolerance of the virtual model of the real part. Block S134 can further enable the user to open the virtual model of the custom fixture for review within the CAD program and/or within the quoting plug-in and to modify the virtual model of the custom fixture directly.

Block S134 can also elect a combination of fixturing methods for the manufacturing a unit of the real part, such as combination of hard jaws, vacuum plate, and custom fixture plate to complete various machining operations at one or more machining centers.

As shown in FIG. 2, in this variation, the method S100 can further include Block S144, which recites, at a second time succeeding the first time, in response to insertion of a second three-dimensional virtual geometry of the virtual model into the computer-aided drafting engine, updating the fixturing method for the real part based on the second three-dimensional virtual geometry. Block S144 can therefore execute methods and techniques described above to revise the fixturing method identified or selected for the real part in Block S134 and to update the manufacturing quote accordingly. For example, as in Block S140, Block S144 can update a feature or geometry of the virtual model of the custom fixture—as generated in Block S134—based solely on a new virtual geometry inserted into the virtual model of the real part. Alternatively, Block S134 can reassess the virtual model of the real part as a whole to reassess one or more fixturing methods for the real part, to estimate associated costs, to elect an alternative fixturing method, and/or to generate a new virtual model for a custom fixture for machining a unit of the real part. Like Blocks S134 and S130, Block S144 can thus cooperate with Block S140 to update the manufacturing quote for the real part in response to insertion of a new virtual geometry, a dimension, and/or a tolerance, etc. into the virtual model of the real part. Block S144 can also flag an updated virtual model of a custom fixture for delivery to the manufacturing facility with submission of an order to the manufacturing facility in Block S170.

The CAD program, the quoting plug-in, or any other local or remote computing device, network, or software can thus execute Blocks S130, S132, S134, S140, S144, S150, and S160, etc. of the method S100 to generate and repeatedly update a manufacturing quote production of a quantity of units of a real part over time throughout construction of a virtual model of the real part within the CAD program. Blocks of the method S100 can merge any number of inputs or parameters—such as material selection, manufacturing process selection, part stock size, manufacturing tolerance, delivery window, and part order quantity, etc.—with facility-related information stored in the quote file to generate the manufacturing quote. For example, Blocks of the method S100 can merge real part data with machining center availability and utilization over time, current machining center fixturing setup, lead times for reconfiguration of machining centers (e.g., working material, fixturing, and/or tooling), common tooling loaded into machining centers, production operations on various machines, part post-processing (e.g., plating, annealing, etc.), projects preceding and following the new order on related machining centers, (tolerance) capabilities of machining centers and tooling combinations, etc. to generate the manufacturing quote. Blocks of the method S100 can also apply any of the foregoing techniques to any type of production process and machining center supported by the manufacturing facility, such as conventional machining (e.g., turning, milling, subtractive manufacturing), forming, cutting, three-dimensional printing (e.g., additive manufacturing), welding, brazing, casting (e.g., die casting, sand casting, etc.), injection molding, plating, annealing, case hardening, etc. However, Blocks S130, S140, S150, and S160, etc. of the method S100 can function in any other way to support generation of a manufacturing quote real-time—for substantially immediately presentation to a user during construction of virtual model a locally—for any one or more manufacturing.

11. Part Order Submission

Figure 5:
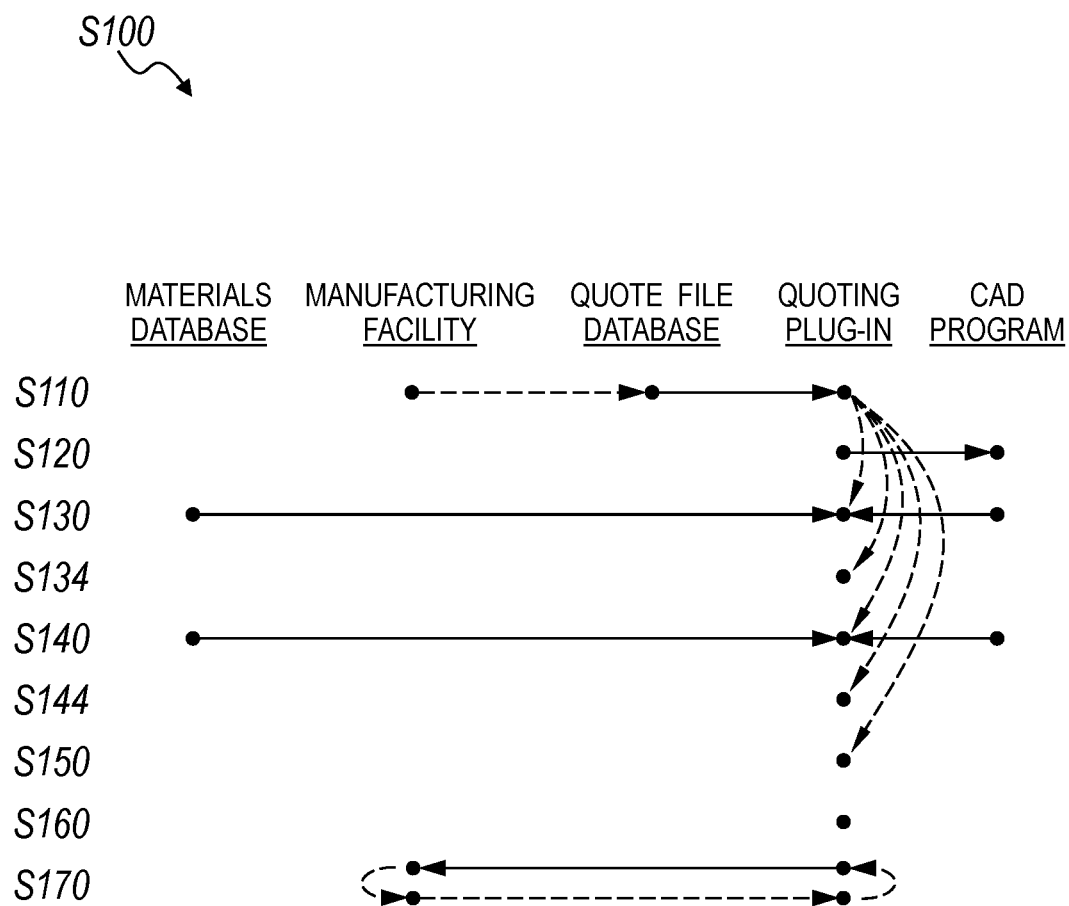
FIG. 5 is a flowchart representation of one variation of the method.

Block S170 of the method S100 recites, at a third time succeeding the second time, submitting, over a computer network, a form of the virtual model to the manufacturing facility for manufacture of the real part in Block S170. Generally, Block S170 functions to receive confirmation for submission of an order for one or more units of the real part from the user through the CAD program and/or quoting plug-in and to transmit relevant part data and order details to the manufacturing facility—such as over a computer network (e.g., the Internet)—for queuing (i.e., scheduling) fulfillment of the order by the manufacturing facility, as shown in FIG. 5.

In one implementation, Block S170 transmits the completed virtual model of the real part in the form of a digital file to the manufacturing facility, such as by uploading the part file in whole to a server affiliated with the manufacturing facility. Similarly, Block S170 can convert the part file containing the virtual model into an alternative file type readable by manufacturing facility and/or can encrypt the part file before transmission to the manufacturing facility, such as according to Data Encryption Standard (DES), Triple Data Encryption Standard (3-DES), or Advanced Encryption Standard (AES) or according to Diffie-Hellman key exchange, Wireless Transport Layer Security (WTLS), or other suitable cryptographic protocol(s). Alternatively, Block S170 can generate an engineering drawing with plan, elevation, and/or breakout sections for the real part based on the virtual model and then transmit these engineering drawing to the manufacturing facility.

Block S170 can also transmit an order form for the real part—directly or indirectly (e.g., through a remote server) to the manufacturing facility over the computer network. For example, the order form can specify a quantity of units of the real part, a material for the real part, a projected delivery date or delivery window, and the projected cost of the order specified in the manufacturing quote. The manufacturing facility can also transmit manufacturing notes, such as specific machining centers and tooling to complete a manufacturing operation for the part, manufacturing operation order and part flips, auto-generated tool paths for various manufacturing operations including callouts for a particular machining center or machining center type and standard or custom tooling, etc.

In the variation of the method S100 Blocks S134 and S144 predict a preferred fixturing method can generate fixturing data when applicable, Block S170 can further submit details of the fixturing method(s) for manufacturing the real part to the manufacturing facility. For example, Block S170 can upload the virtual model of the custom fixture calculated for one or more machining orientations for the real product. Block S170 can also upload an order list of machining operations with each machining operation defining a part origin, a part orientation, an initial geometry, a final geometry of the unit of the real part, a machining center, and/or tooling, etc. Block S170 can therefore also communicate various manufacturing-related data—generated during previous execution of other Blocks of the method S100—to the manufacturing facility to provide immediate guidance to the manufacturing facility in: queuing the order; reserving machining centers, tooling, and fixtures; ordering materials; preparing custom fixtures; and/or preparing custom tooling (e.g., molds).

Once such data for the order is communicated to the manufacturing facility in Block S170, a live engineer or human representative of the manufacturing facility can review the quote and the order data to confirm details of the order and/or to pass the order back to the user for edits, changes, or clarifications, such as to confirm a tolerance on a bore, to suggest an alternative dimension or geometry to improve ease of manufacture and reduce part cost, or to suggest an alternative material for the real part. Block S140, Block S144, etc. can then repeat to adjust the manufacturing quote in response to adjustment of the virtual model and/or other details of the order, as described above, as shown in FIG. 5.

In one implementation, Block S170 enables the representative to override the manufacturing quote and/or to override a fixturing prediction, predicted part flips, a projected manufacturing sequence, and/or any other manufacturing-related detail defined in or related to the order and to the manufacturing quote. For example, the representative can enter an alternative fixturing setup, alter fixturing elements (e.g., tabs) machined with the part, enter an alternative part flip and manufacturing sequence, or alter any other manufacturing detail received with the order in Block S170; Block of the method S100 can then automatically revise the manufacturing quote according to such changes entered by the representative.

The method S100 can further implement supervised or semi-supervised machine learning to improve the manufacturing and quote model over time as additional representative changes are submitted for various part orders, such as by automatically updating a pricing model defined in the quote file or by modifying a fixturing engine for generating virtual models of custom fixtures.

In this implementation, Block S170 can also interface with a communication (e.g., chat) window within the CAD program or within the quoting plug-in to enable textual, audio, and/or visual communication between the user and the representative. Block S170 can thus enable the user to prompt the representative to provide insights into cost breakdowns of the manufacturing quote or to provide alternative manufacturing suggestions for the real part. Alternatively, Block S170 can automatically trigger review of the order or the manufacturing quote review by the representative in response to a high cost-per-unit quote, such as relative to a number of virtual geometries within the virtual model or relative to a ratio of virtual surface area to virtual volume in the virtual model of the part defined in the part file.

The part order data can be similarly reviewed by an automated system and passed back to the user for similar edits, changes, or clarifications, etc. Alternatively, the part order can be automatically queued in the manufacturing facility's production schedule once the part order data is received. In this implementation, the automated system can implement similar methods and techniques described above to confirm or alter the quote, such as based on more recent and/or more detailed manufacturing facility data and/or material availability data. For a revised quote generated at the automated system that differs by more than a threshold amount (e.g., currency amount, percentage) from the original quote generated at the user's workstation, the automated system can transmit the updated quote back to the user for confirmation of the order. In this example, the automated system can also transmit the revised quote, parameters or the revised quote, etc. back to the CAD program and/or the quoting plug-in to revise or update a quoting model implemented by the CAD program and/or the quoting plug-in such that future quotes generated at the workstation better match quotes generated at the (master) automated system.

Block S170 can also handle payment from the user to the manufacturing facility, such as for a portion of the manufacturing quote, such as for 20% of the total of manufacturing quote or upfront payment for all tooling and stock material cost. Once the order is fulfilled, Block S170 can also handle payment of the remainder of the balance from the user to the manufacturing facility. However, Block S170 can function in any other way to communicate (e.g., transmit) a form of the part file and the manufacturing quote to the manufacturing facility once the part order is confirmed locally by the user through the CAD program or through quoting plug-in, etc.

The systems and methods of the invention can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for improving quoting of manufacture for a real part corresponding to a virtual model, the system comprising:
a quoting add-in executing within a computer-aided drafting engine, the quoting add-in configured to:
receive a quote file for manufacturing the real part at a manufacturing facility;
at a first time, in response to accessing a first three-dimensional virtual geometry of the virtual model, calculate a manufacturing quote for the real part based on the first three-dimensional virtual geometry and the quote file, wherein calculating the manufacturing quote comprises:
determining a fixturing method for manufacturing the real part based on the first three-dimensional virtual geometry;
determining a cost for the fixturing method; and calculating the manufacturing quote for the real part based on the first three-dimensional virtual geometry and the cost of the fixturing method;

display the manufacturing quote;

at a second time succeeding the first time, in response to accessing a second three-dimensional virtual geometry of the virtual model:

update the fixturing method for the real part based on the second three-dimensional virtual geometry; and update the manufacturing quote based on the second three-dimensional virtual geometry and the updated fixturing method; and submit an order for manufacture of the real part to the manufacturing facility over a computer network;

wherein the real part is machined from stock material at the manufacturing facility, according to the updated fixturing method and the virtual model.

2. The system of claim 1, wherein the manufacturing quote is calculated in substantially real-time with virtual model access.

3. The system of claim 1, wherein the quote file specifies a current manufacturing schedule, a material availability, and the pricing structure for the manufacturing facility.

4. The system of claim 3, wherein calculating the manufacturing quote for the real part further comprises calculating the manufacturing quote for the real part based on a quantity of units of the real part, and a delivery time of the quantity of units of the real part entered into the computer-aided drafting engine.

5. The method of claim 1, wherein determining the cost for the fixturing method comprises:

determining a virtual fixture associated with a real custom fixture for manufacturing the real part;

calculating a materials cost for the real custom fixture based on the virtual fixture;

calculating a machining time for the real custom fixture based on the virtual fixture; and calculating a total cost for the real custom fixture based on the materials cost and the machining time for the real custom fixture;

wherein the manufacturing quote is further calculated based on the total cost for the real custom fixture.

6. The system of claim 5, wherein the quoting add-in is further configured to receive a quantity of units of the real part for order; and wherein predicting the fixturing method for the real part comprises:

calculating a first cost to manufacture the quantity of units of the real part using a standardized fixture;

calculating a second cost to manufacture the quantity of units of the real part with the real custom fixture; and selecting the real custom fixture over the standardized fixture in response to the first cost exceeding the second cost.

7. A system for quoting manufacture of a real part during construction of a virtual model of the real part, the system comprising:

a quoting add-in executing within a computer-aided drafting engine, the quoting add-in configured to:

receive a quote file specifying a current manufacturing schedule and a pricing structure for a manufacturing facility;

in response to accessing a three-dimensional virtual geometry of the virtual model, calculate a manufacturing quote for the real part based on the three-dimensional virtual geometry and the quote file;

display the manufacturing quote; and transmit a form of the virtual model to the manufacturing facility for manufacture of the real part.

8. The system of claim 7, wherein the quoting add-in is further configured to, in response to accessing a second three-dimensional virtual geometry of the virtual model, update the manufacturing quote displayed within the computer-aided drafting engine based on the second three-dimensional virtual geometry and the quote file.

9. The system of claim 8, wherein the quoting add-in is further configured to receive a user confirmation of the updated manufacturing quote, associated with the second three-dimensional virtual geometry, prior to transmitting the form of the real part to the manufacture facility.

10. The system of claim 7, wherein the quoting add-in is further configured to determine a failure risk for manufacturing a unit of the real part according to the first three-dimensional virtual geometry; wherein calculating the manufacturing quote further comprises calculating the manufacturing quote based on the failure risk.

11. system of claim 10, wherein the quoting add-in is further configured to control the computer-aided drafting engine to render a virtual surface of the virtual model in a color corresponding the failure risk.

12. The system of claim 10, wherein the quote file further comprises a manufacturing history of the manufacturing facility; and wherein the failure risk is estimated according to the manufacturing history of the manufacturing facility.

13. The system of claim 7:

wherein the quote file further specifies a relationship between manufacturing cost and a total part surface area; and wherein calculating the manufacturing quote further comprises calculating the manufacturing quote based on a total virtual surface area of the first three-dimensional virtual geometry of the virtual model and the relationship between manufacturing cost and total part surface area.

14. The system of claim 7, wherein calculating the manufacturing quote comprises calculating the manufacturing quote according to a default tolerance for the first three-dimensional virtual geometry.

15. The system of claim 7:

wherein the virtual model further comprises a dimensional tolerance of the three-dimensional virtual geometry; and wherein calculating the manufacturing quote further comprises calculating the manufacturing quote based on the dimensional tolerance of the three-dimensional virtual geometry.

16. The system of claim 7, wherein the quoting add-in is further configured to:

receive a selection for a delivery time of a unit of the real part; and update the manufacturing quote according to the selection for the delivery time and a current manufacturing schedule of the manufacturing facility.

17. The system of claim 7, wherein the quoting add-in is further configured to:

access a second quote file specifying a current manufacturing schedule and a pricing structure for at least one of the manufacturing facility and a second manufacturing facility; and updating the displayed manufacturing quote based on the second quote file.

18. The system of claim 7, wherein calculating the manufacturing quote for the real part comprises:

estimating a machining time to machine a unit of the real part according to the three-dimensional virtual geometry; and calculating the manufacturing quote for the unit of the real part based on the machining time.

19. The system of claim 7, wherein the quote file further specifies a list of standard cutting tools available at the manufacturing facility; and wherein calculating the manufacturing quote for the real part comprises:

selecting a cutting tool from the list of standard cutting tools based on the three-dimensional virtual geometry; and calculating the manufacturing quote based on a cost of the cutting tool.

20. The system of claim 7:

wherein the quoting add-in is further configured to determine a set of manufacturing parameters for manufacturing a unit of the real part based on the virtual model; and wherein calculating the manufacturing quote further comprises calculating the manufacturing quote based on a price associated with the set of manufacturing parameters.

\* \* \* \* \*